United States Patent
Hayashi

(10) Patent No.: US 6,194,047 B1
(45) Date of Patent: *Feb. 27, 2001

(54) MAGNETIC RECORDING MEDIUM

(75) Inventor: Shigenori Hayashi, Kanagawa (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/920,719

(22) Filed: Aug. 29, 1997

Related U.S. Application Data

(62) Division of application No. 08/823,541, filed on Mar. 25, 1997, now Pat. No. 5,989,672, which is a division of application No. 08/154,009, filed on Nov. 18, 1993, now Pat. No. 5,637,373.

(30) Foreign Application Priority Data

Nov. 19, 1992 (JP) ........................................... 4-333607

(51) Int. Cl.[7] ................................................. G11B 5/66
(52) U.S. Cl. .................. 428/65.3; 428/65.5; 428/694 T; 428/694 TP; 428/694 TC; 428/694 TR; 428/141; 428/336; 428/408; 428/704; 428/698; 428/900
(58) Field of Search .................. 428/65.3, 65.5, 428/694 T, 694 TP, 694 TC, 694 TR, 141, 336, 408, 704, 698, 900

(56) References Cited

U.S. PATENT DOCUMENTS

| | | | |
|---|---|---|---|
| 4,647,494 | * 3/1987 | Meyerson et al. | 428/216 |
| 4,717,622 | * 1/1988 | Kurokawa | 428/408 |
| 4,774,130 | * 9/1988 | Endo et al. | 428/216 |
| 4,804,590 | 2/1989 | Nakamura et al | 428/408 |
| 4,840,844 | * 6/1989 | Futamoto et al. | 428/336 |
| 4,880,687 | * 11/1989 | Yokoyama et al. | 428/141 |
| 4,892,789 | * 1/1990 | Nakayama et al. | 428/336 |
| 4,996,079 | 2/1991 | Itoh | 427/570 |
| 5,110,676 | 5/1992 | Murai et al | 428/336 |
| 5,266,409 | * 11/1993 | Schmidt et al. | 128/201.23 |
| 5,275,850 | * 1/1994 | Kitoh et al. | 427/577 |
| 5,364,690 | 11/1994 | Takahashi et al | 428/212 |
| 5,446,431 | 11/1995 | Dorfman et al | 335/18 |
| 5,500,296 | 3/1996 | Inoue et al | 428/408 |
| 5,637,373 | * 6/1997 | Hayashi | 428/65.3 |
| 5,637,393 | 6/1997 | Ueda et al | 428/332 |
| 5,853,871 | 12/1998 | Kitaori et al | 428/332 |
| 5,945,219 | 8/1999 | Yamada et al | 428/408 |

FOREIGN PATENT DOCUMENTS

| | | |
|---|---|---|
| 58-42472 | * 3/1983 | (JP) . |
| 61-220119 | 9/1986 | (JP) . |
| 62-211124 | 10/1987 | (JP) . |
| 63-122116 | 5/1988 | (JP) . |
| 64-76422 | 3/1989 | (JP) . |
| 1-96820 | 4/1989 | (JP) . |
| 1-154314 | 6/1989 | (JP) . |
| 1-226711 | * 9/1989 | (JP) . |
| 2-83816 | * 3/1990 | (JP) . |
| 2-125877 | * 5/1990 | (JP) . |
| 2-149924 | 6/1990 | (JP) . |
| 2-208827 | 8/1990 | (JP) . |
| 3-19120 | 1/1991 | (JP) . |
| 3-76023 | 4/1991 | (JP) . |
| 3-176814 | 7/1991 | (JP) . |
| 3-256220 | 11/1991 | (JP) . |
| 4-134623 | 5/1992 | (JP) . |
| 4-313812 | 11/1992 | (JP) . |

\* cited by examiner

*Primary Examiner*—Leszek Kiliman
(74) *Attorney, Agent, or Firm*—Nixon Peabody LLP; Jeffrey L. Costellia

(57) ABSTRACT

A magnetic recording medium having a diamond-like carbon (DLC) film added therein a Group IV element of the periodic table such as silicon, particularly in the vicinity of the boundary between the magnetic material and the formed DLC film. Since a DLC having low friction coefficient can be formed, the centerline average roughness can be reduced to 30 nm or even less. Accordingly, a magnetic recording medium improved in magnetic properties and in lubricity can be obtained.

49 Claims, 7 Drawing Sheets

MAGNETIC RECORDING MEDIUM

This is a Divisional application of Ser. No. 08/823,541, filed Mar. 25, 1997 now U.S. Pat. No. 5,989,672; which itself is a division of Ser. No. 08/154,009, filed Nov. 18, 1993 (Now U.S. Pat. No. 5,637,373).

BACKGROUND OF THE INVENTION

1. Field of the Invention

The present invention relates to a magnetic recording medium such as an audio and a video tape, a floppy diskette, and a hard disk. In particular, the present invention relates to a technique for coating magnetic thin films to provide magnetic recording media having improved properties.

2. Prior Art

A magnetic recording medium such as an audio and a video tape, a floppy diskette, and a hard disk is generally constructed by forming a magnetic film on a substrate support made of an organic resin or a metal and the like. The magnetic film is formed by coating or by a vacuum process such as vapor deposition and sputtering. If the process cost is the matter of concern, coating is the choice in forming the magnetic film, and if high performance is required on the obtained film, a vacuum process is selected.

When in use, magnetic recording media are under a mechanical load because they are constantly or temporarily brought into contact with a magnetic head (an apparatus for writing and reading signals) or a mechanical component thereof, and with mechanical parts such as a capstan and a roller. Accordingly, not only magnetic properties but also mechanical durability and lubricity are required to the magnetic recording media to resist the above mechanical load. Conventionally, attempts had been made to lower the friction coefficient of the magnetic media, for example, by applying a lubricant coating to the surface of the magnetic film, or by forming irregularities on the surface to substantially reduce the contact area between the contact member and the magnetic film. However, the lubricant film suffers wear by repeated contact and sliding, to result in an increase of the friction coefficient thereof. Accordingly, the degradation proceeds in an accelerated manner.

Recent trend treats information which had been conventionally analog signals such as images and sound as digital signals. Accordingly, the reliability of magnetic recording medium on recording is required. Under such circumstances, the friction coefficient of a magnetic recording medium must be maintained stably at a low level.

A magnetic thin film is formed by either coating a substrate with a mixture of a powder of a magnetic material and an organic polymer, or by forming a layer of the magnetic material alone on a substrate by a vacuum process such as vapor deposition and sputtering. Thin films having better magnetic properties can be obtained by a vacuum process. The magnetic material is generally a ferrite or a metal, etc. Metallic magnetic materials specifically include NiCo and CoPtCr alloys.

Alternatively, methods for forming a hard coating of carbon or a material containing carbon as the principal component by plasma CVD process are disclosed, for example, in JP-B-3-72711, JP-B-4-27690, and JP-B-4-27691 (the term "JP-B-" as referred herein signifies an "examined Japanese patent publication"). Those well known processes comprise introducing a hydrocarbon gas and a hydrogen gas as material gases inside a vessel maintained under a reduced pressure, applying generally a high frequency electric field to a pair or more electrodes installed inside the vessel, and forming a plasma of the material gas to thereby activate and deposit grains containing carbon on the substrate.

The coating thus obtained is called diamond-like carbon (abbreviated as DLC hereinafter) because it is extremely hard and exhibits diamond-like characteristics. In general, DLC is deposited by applying self bias or a bias from an external power supply, so that a negative bias with respect to the plasma potential may be applied to the substrate. In this manner, the bonds having the graphite-like characteristics (attributed to the combination of $sp^2$ hybrid orbital and p orbital) within the carbon film are etched to leave mainly the bonds exhibiting the diamond-like characteristics attributed to $sp^3$ hybrid orbital.

Such a DLC thin film is very hard as to yield a Vicker's hardness of 2,000 $kg/mm^2$ or even higher, and is also low in friction coefficient. Accordingly, the DLC film is suited as a protective and lubricant film to coat the surface of a magnetic film.

When applied to the surface of a magnetic material, and particularly to the surface of a metallic magnetic material, however, the aforementioned DLC film easily undergoes separation after film deposition, or suffers peeling off upon bringing it in contact with or sliding it against a mechanical component. The DLC films were not practically feasible, therefore, due to their insufficiently low adhesion strength.

SUMMARY OF THE INVENTION

Under the light of the circumstances above, the present invention provides a magnetic thin film having thereon a coating containing carbon as the principal component, added therein an element selected from the group consisting of boron, aluminum, gallium, nitrogen, phosphorus and arsenic. Alternatively, the present invention provides a magnetic thin film having thereon a coating of pure carbon or a coating containing carbon as the principal component, added therein 20% by atomic or less of an element belonging to Group IV of the periodic table (referred to simply hereinafter as a "Group IV element"). More specifically, a Group IV element includes Si and Ge, Sn (tin) and Pb (lead).

DETAILED DESCRIPTION OF THE INVENTION

Figure 1:
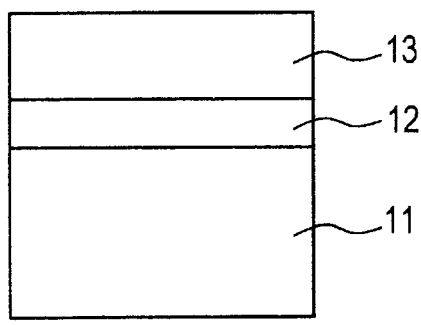
FIG. 1 shows schematically the layer structure of a magnetic recording medium.

The reason why the adhesibility of a DLC film according to the present invention increases can be explained as follows. A DLC film contains both a bond having graphite-like characteristics (attributed to the combination of an $sp^2$ hybrid orbital and a p orbital) and a bond exhibiting diamond-like characteristics (attributed to an $sp^3$ hybrid orbital). In an $sp^3$ hybrid orbital, four a electrons contribute to the bond, but in a combination of an $sp^2$ hybrid orbital and a p orbital, three $\sigma$ electrons and one $\pi$ electron form a bond. Since the bond force is lower for the bond attributed to $\pi$ electron as compared with that with $\sigma$ electrons being incorporated, a DLC film containing $sp^3$ hybrid orbital at a higher fraction results in a higher hardness more nearer to the properties of a diamond. The same holds in a case applied to the boundary with a metal, and hence a more favorable adhesion or a higher bonding force can be realized by reducing as possible the number of carbon atoms based on a combination of $Sp^2$ hybrid orbital and p orbital.

In contrast to the above, it is well established that silicon atoms take only the $sp^3$ hybrid orbital state (four-coordinated). It is also well known that when a three- or five-coordination element is added alone into the four-coordinated elements, the added element accommodate itself into a more thermally stable four-coordination. Specifically, this phenomenon can be observed by adding P (phosphorus) or B (boron) as a dopant into Si (silicon), because the added P or B changes into a four-coordinated state. More specifically, when a silicon atom which takes only the four-coordination state is added to the vicinity of a three-coordinated (attributed to the combination of an $sp^2$ hybrid orbital and a p orbital) carbon atom, the carbon atom changes itself into a four-coordinated state to increase the fraction of carbon atoms having the $sp^3$ hybrid orbital as a result. Assumably in this manner, the adhesibility of a DLC film added therein silicon atoms is increased.

The silicon atoms are preferably added into the DLC at an amount of 20% by atomic or less, and more preferably, from 1 to 15% by atomic. If silicon is added excessively into DLC, the fractions of C—Si and Si—Si bonds increase to reversely decrease the amount of C—C bonds. The presence of excessively large amount of C—Si and Si—Si bonds in the DLC film affects the film to yield silicon-like properties. Accordingly, it results in a low hardness and an increase in friction coefficient. Silicon must be added within an optimal range of addition.

The DLC film contains hydrogen in addition to carbon and silicon. This is because hydrocarbon is used as the starting gas material, but in cases, hydrogen is positively added into the gas material. The hydrogen atoms inside the film function as terminators of the dangling bonds to improve the electric and optical properties as well as the thermal stability of the resulting film. The DLC film according to the present invention also contains from 10 to 60% by atomic, and preferably, from 15 to 40% by atomic of hydrogen.

Elements belonging to Group III or Group V of the periodic table (referred to simply hereinafter as Group III or Group V element) may be added additionally into the DLC film. Specifically mentioned as the Group III elements are boron, aluminum, and gallium; Group V elements include specifically nitrogen, phosphorus, and arsenic. Those additional Group III or Group V elements function in such a manner to relax the internal stress of the DLC film. Since the adhesibility of the entire film largely depends on the adhesion strength at the boundary between the DLC film and the magnetic material, the internal stress of the DLC itself can be lowered to improve the adhesibility of the entire film. In other words, the internal stress of the DLC film itself, which functions as the drive force to cause peeling of the film off the magnetic material, is relaxed.

The magnetic material of the present invention comprises a metal or metal alloy such as Fe, Co, Ni, and an alloy thereof (e.g. Co—Ni alloy). Alternatively, the magnetic material of the present invention comprises a metal oxide such as $\gamma\text{-}Fe_2O_3$, $CrO_2$ and $\text{Co-}\gamma\text{-}FeO_x$.

The concentration of silicon atoms inside DLC may be constant along the depth direction of the film, buy it is more preferred that the concentration of silicon atoms is gradually increased with increasing depth from the surface of the film. This is because the friction coefficient increases with increasing fraction of the $sp^3$ bonds and hence with increasing concentration of silicon atoms. Thus, the DLC film is preferably separated into at least two layers of differing functions by adding silicon to the portion in the vicinity of the boundary to increase the $sp^3$ fraction and hence the adhesibility thereof, while not adding any silicon to the surface portions to which low friction coefficient is required. A function-separated type DLC film is preferred for the application on a magnetic thin film.

Figure 10A:
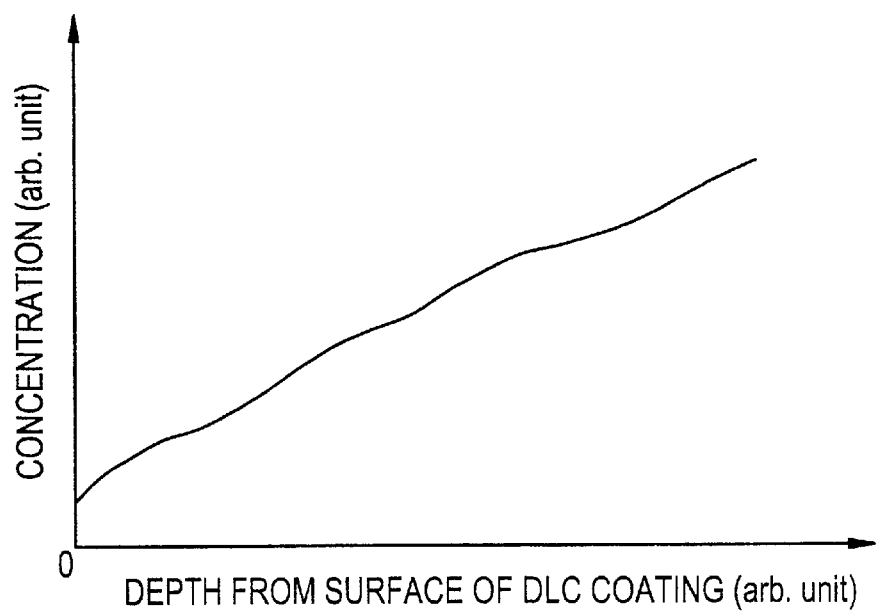
FIGS. 10(A) and 10(B) are graphs each showing an impurity concentration profile.
Figure 10B:
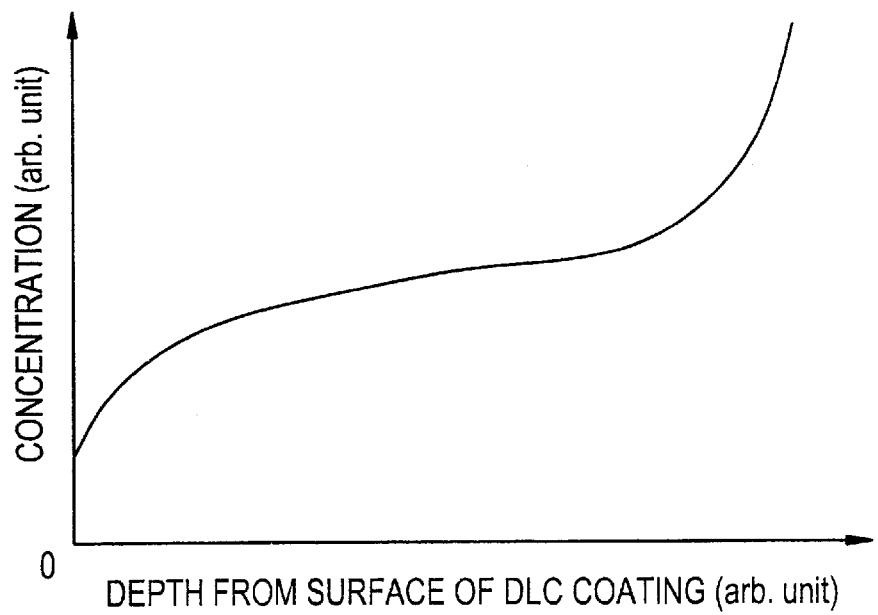

For example, the DLC film may have an impurity (e.g. silicon, germanium, tin and lead) concentration profile as shown in FIG. 10(A) or FIG. 10(B). The impurity concentration is increased from the boundary of the magnetic film and the DLC film to a surface of the DLC film, and also the impurity concentration in a portion of the DLC film near the surface of the DLC film is larger than that near the boundary, as shown in FIGS. 10(A) and 10(B).

A DLC film improved in adhesibility by the method described above was subjected to an experiment. It was confirmed by the experiment that the surface irreguralities employed in the prior art technique becomes unnecessary in the present invention by virtue of the DLC film. It was therefore found possible to considerably improve the magnetic property of the magnetic recording medium by reducing the distance between the magnetic head and the magnetic material. The reason for these effects is explained below.

Assuming that the magnetization per unit area is generally constant, the S/N ratio increases with decreasing distance between the magnetic head and the magnetic material. If the distance between the magnetic head and the magnetic material is sufficiently short, on the contrary, the magnetic flux attributed to a S/N ratio higher than a specified level can be reduced. Accordingly, it can be seen that the reliability of recording can be improved by bringing the magnetic head to a position as near as possible to the magnetic material.

A prior art magnetic recording medium had surface irregularities to lower the friction coefficient of the surface. By providing the surface of the film with irregularities, the effective area of contact can be reduced and lower the friction coefficient thereof. But this measure is, so to say, giving priority to the lowering of friction coefficient at the expense of favorable magnetic properties.

In contrast to the above, the present invention allows both of the conflicting properties to stand at the same time. More specifically, the present invention lowers the friction coefficient between the surface of the magnetic recording medium and various mechanical components while improving reliability of recording.

According to the experiment of the present inventors, a friction coefficient of the surface of the magnetic material without a DLC coating was found to be about 0.4 in case a centerline average roughness Ra is 30 nm, and 0.8 with an Ra of 10 nm. Since a practically feasible value for the friction coefficient is 0.4 or lower, at least an Ra of 30 nm is necessary for a case no DLC coating is formed on the magnetic material. In contrast to these results, the surface of a magnetic material coated with an DLC was found to yield a friction coefficient in a low level range of from 0.2 to 0.4 even at an Ra of 10 nm. Moreover, the material coated with DLC was found to yield a stable friction coefficient even after subjecting it to repeated sliding motion.

Experimental results revealed that the friction coefficient depends on the film thickness of DLC, that is, the friction coefficient is decreased as the thickness of DLC increases. A practical friction coefficient can be obtained on a DLC film with a thickness of 10 to 200 Å.

It can be seen that the magnetic properties of a film can be improved by applying the present invention, yet maintaining the friction coefficient to a low level and reducing the surface irregularities.

The process for fabricating a DLC coating is described below.

DLC can be produced by plasma CVD process as described hereinbefore in the description of prior art. The plasma CVD process can be performed by either a general process using parallel planar electrodes or a positive column type plasma CVD which utilizes the positive column portion of the plasma. The application of the process using parallel planar electrodes is restricted to flat substrates, but the process using the positive column is applicable to three-dimensional structures. It can be seen that the process using a positive column is advantageous because it is applicable to any substrate having a desired shape. and because it is suited for mass production.

When a planar substrate is used, it is set to a substrate holder and then maintained inside a reaction chamber. If a film substrate is used, it is introduced into vacuum in a rolled shape, and then run through the reaction chamber by taking it up from a roll to another roll.

Hydrocarbon can be used as the reaction gas for the carboz source. Hydrocarbons for use in the process include a saturated hydrocarbon (e.g., methane, ethane, propane, and butane), an unsaturated hydrocarbon (e.g., ethylene and acetylene), and an aromatic hydrocarbon (e.g., benzene and toluene). Adamantane, adamantanol, etc., may be used as well. Furthermore, halogenated hydrocarbons containing halogens such as fluorine, chlorine, and bromine as substituents substituting for one or a plurality of hydrogen atoms may be used.

The reactive gas may also contain hydrogen in addition to hydrocarbons. The hydrogen radicals inside the plasma can be increased by adding hydrogen to the reactive gas, and hence, hydrogen atoms present in the film in excess are expected to be pulled out from the film. Accordingly, a film with further improved quality can be obtained. Hydrogen is flown with the reactive gas at a flow ratio of from 30 to 90%, preferably 50 to 70% with respect to the total gas flow. If the ratio of the hydrogen gas flow to the total gas flow should be too high, the film deposition rate would be decreased. If the ratio should be too low, on the contrary, the function of pulling out excessive hydrogen from the film would not be expected any more.

To add a Group IV element, i.e., silicon, compounds such as silane, disilane, fluorine-containing silane, etc., may be used. In adding germanium, useful gases include germane and fluorine-containing germane. A Group III element can be added by using diborane, boron trifluoride, trimethylborane, etc. A Group IV element can be added by using $N_2$, ammonia, nitrogen trifluoride, etc., in case of adding nitrogen; and to add phosphorus, phosphine and the like can be used. The flow ratio of those gases depend on other film deposition parameters such as the pressure and the applied electric power, but in general, the flow ratio is preferably controlled to a ratio of 10% or less with respect to the flow ratio of the carbon source gas.

Then, the reactive gas is introduced inside the reaction vessel, the pressure thereof is controlled to a predetermined value, and a high frequency electric power is applied to a pair or a plurality of electrodes installed inside the reaction vessel. A total reactive gas flow rate of 30 sccm or higher, preferably 50 sccm or higher, is necessary for a reaction chamber having a volume of about $0.02 \text{ m}^3$. The upper limit of the total flow depends on the evacuation rate of the evacuation system, but a gas flow with a lower limit as above must be maintained.

The reaction pressure is in the range of from 5 to 1,000 mTorr, preferably in the range of from 10 to 100 mTorr. In general, a high frequency power with a frequency of 13.56 MHz is used. The applied electric power is preferably in the range of from 0.01 to 1 $W/cm^2$, and more preferably in the range of from 0.05 to 0.5 $W/cm^2$.

The substrate need not be heated. This is a merit in applying the process to mass production.

In depositing a DLC film, it is advantageous to apply an electric field to the reaction chamber in such a manner that the particles, mainly ions, inside the plasma would be incident on the surface of the substrate. A hard and dense film can be obtained as a result. In the case a plasma CVD based on a parallel planar electrodes method is used, a blocking capacitor may be installed on the electrode on the side for supplying an RF power to generate self bias, so that it may be used to generate the electric field to guide the ions incident to the surface of the substrate. In this case, the substrate is placed on the side for supplying the RF power.

In a case positive column type plasma CVD apparatus is used, an external electric power source must be used to generate the aforementioned electric field, because ions would not be incident on the substrate if the substrate is set simply inside the positive column. AC is effective as an electric field applied from an external power source. The frequency is preferably controlled to be in the range between the ion plasma frequency and the electron plasma frequency inside the plasma. The ion plasma frequency yields a value about several digits smaller than the electron plasma frequency ascribed to the difference in mass of the ion and the electron. If an external electric field with a frequency lower than the electron plasma frequency but higher than the ion plasma frequency is applied, the ions would not be able to move sufficiently to follow the external electric field, but the electrons would follow the external electric field. In this manner, a substrate having a surface negatively charged up can be obtained. As a result, an electric field that would allow the ions to be incident on the surface of the substrate may be generated, and a hard and dense DLC film would be obtained by the reaction between the incident ions and the film surface. The frequency of the external electric field for applying bias depends on the temperature and density of the electrons as well as the temperature and density of the ions inside the plasma, but preferably, it is in the range of from 1 to 1,000 kHz, and more preferably, in the range of from 10 to 500 kHz. The peak to peak intensity of the electric field is in the range of from 50 to 1,000 V, and preferably from 100 to 400 V.

Furthermore, in the case of a metallic magnetic thin film is deposited by a vapor deposition process according to the present invention, in particular, it has excellent adhesibility with a carbon film added therein a Group IV element.

EXAMPLE 1

The present embodiment relates to a magnetic recording medium formed on a film substrate. FIG. 1 shows the layer structure of the magnetic film fabricated by a process according to the present example.

A magnetic film 12 was deposited on the surface of a support substrate, a 7 μm thick polyethylene terephthalate (PET) film 11 having a centerline average roughness Ra of 3 nm and being supplied as a roll 400 nm in width. A CoNi alloy was used as the magnetic film 12. A 200 nm thick film was obtained by vacuum deposition. A DLC film 13 was then deposited on the magnetic film 12, varying the thickness within a range of from 10 nm to 50 nm.

The DLC film was deposited using a CVD apparatus of a positive column type. A pair of electrodes 22 as shown with broken lines in FIG. 2 were installed inside a vacuum vessel 21, and an RF power was supplied to the electrodes 22 from an RF power source (not shown in FIG. 2) via a matching box (not shown in FIG. 2) to form a plasma inside a reaction chamber 25. As material gases, methane and hydrogen gases were supplied at a flow rate of 50 sccm each. Otherwise, they were supplied at a rate of 30 sccm and 70 sccm, respectively. The pressure was controlled to 10 mTorr. An RF power of 100 W was applied.

To add silicon at the boundary between DLC and the magnetic film, $SiH_4$ gas was added to the reactive gas for a duration corresponding to 10% of the entire duration of reaction, i.e., for a period of 1 minute. The gas was supplied at a flow rate of 2.5 sccm.

The substrate film 26 was supplied from a feed roll 26, and taken up using a take-up roll 27. The film was subjected to a plurality of turns inside the reaction chamber 25 by rolls 28 to effectively use the reaction chamber, thereby increasing the through put.

A bias electrode 29 was set in contact with the back plane of the film to apply thereto a bias electric field, The bias potential frequency was 50 kHz, and the bias potential expressed by peak to peak value was 200 V.

Figure 3:
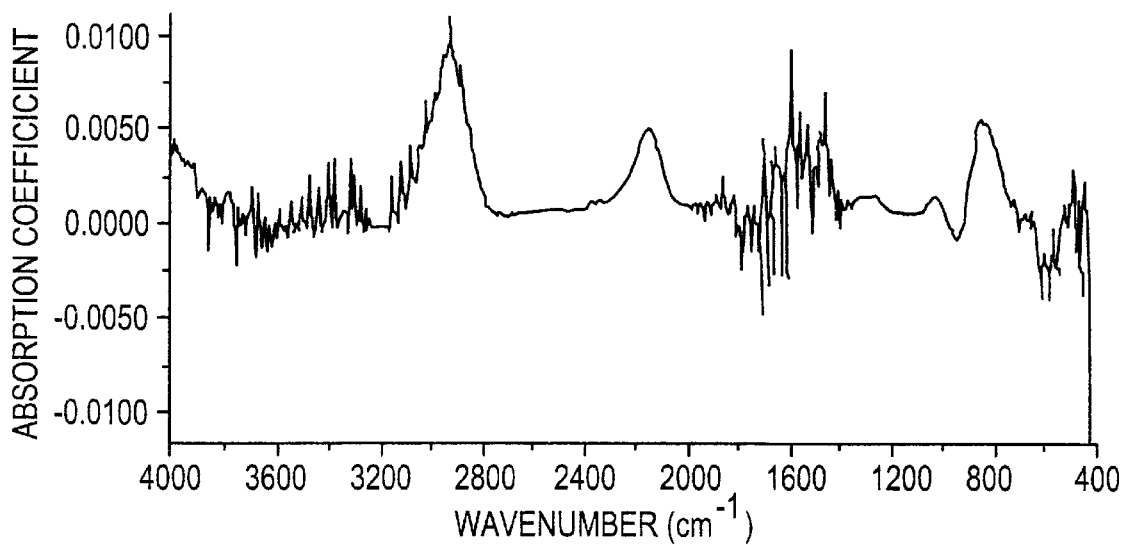
FIG. 3 shows an infrared spectrogram obtained by FT-IR (Fourier transform infrared spectroscopy) analysis for a DLC film containing silicon.
Figure 4:
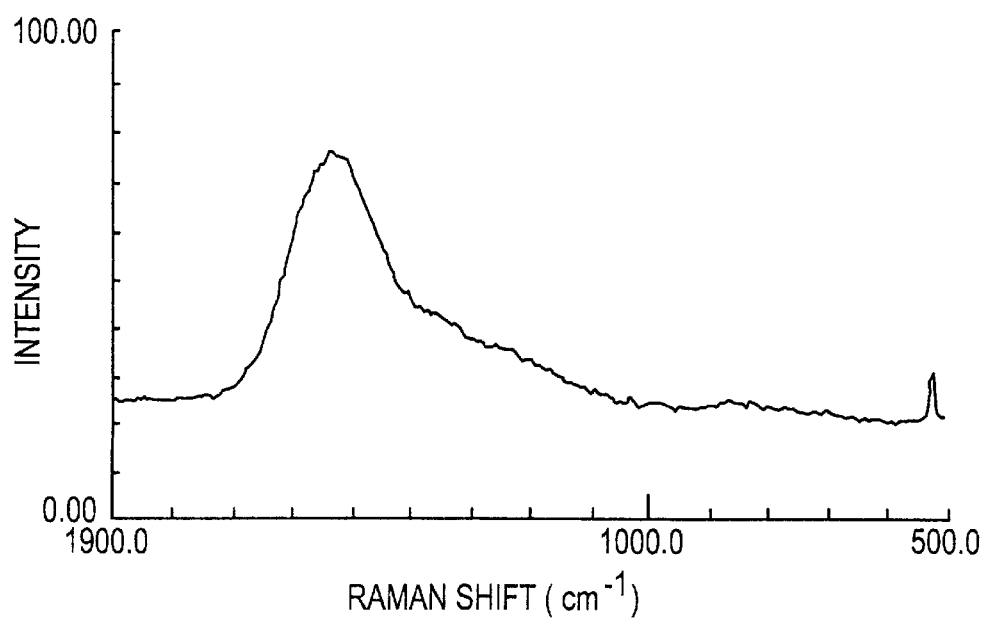
FIG. 4 shows a Raman spectrogram obtained for a DLC film containing silicon.

At the same time, a silicon wafer was set inside the same batch to monitor the film quality. The film quality of the deposited film thus obtained as a sample was evaluated to obtain a Knoop hardness of 2,500 $kg/mm^2$. The infrared (IR) spectrogram obtained by FT-IR analysis and the Raman spectrogram for the sample are given in FIGS. 3 and 4, respectively. The FT-IR analysis reveals the presence of an absorption band in the wavenumber range of from 700 to 800 $cm^{-1}$ assigned to Si—C bond, and an absorption assigned to Si—H bond at ca. 2,100 $cm^{-1}$. Raman spectrogram reads a broad scattered light peak at ca. 1,550 $cm^{-1}$ characteristic of DLC. It can be seen from those results that Si is added while maintaining the structure of a DLC.

The friction coefficient of the magnetic tape obtained in the present Example was measured by coiling the tape for half the periphery of a 3-mm diameter stainless steel pin, and applying a load of 20 g at a sliding speed of 428 mm/min for a distance of 50 mm.

Figure 5:
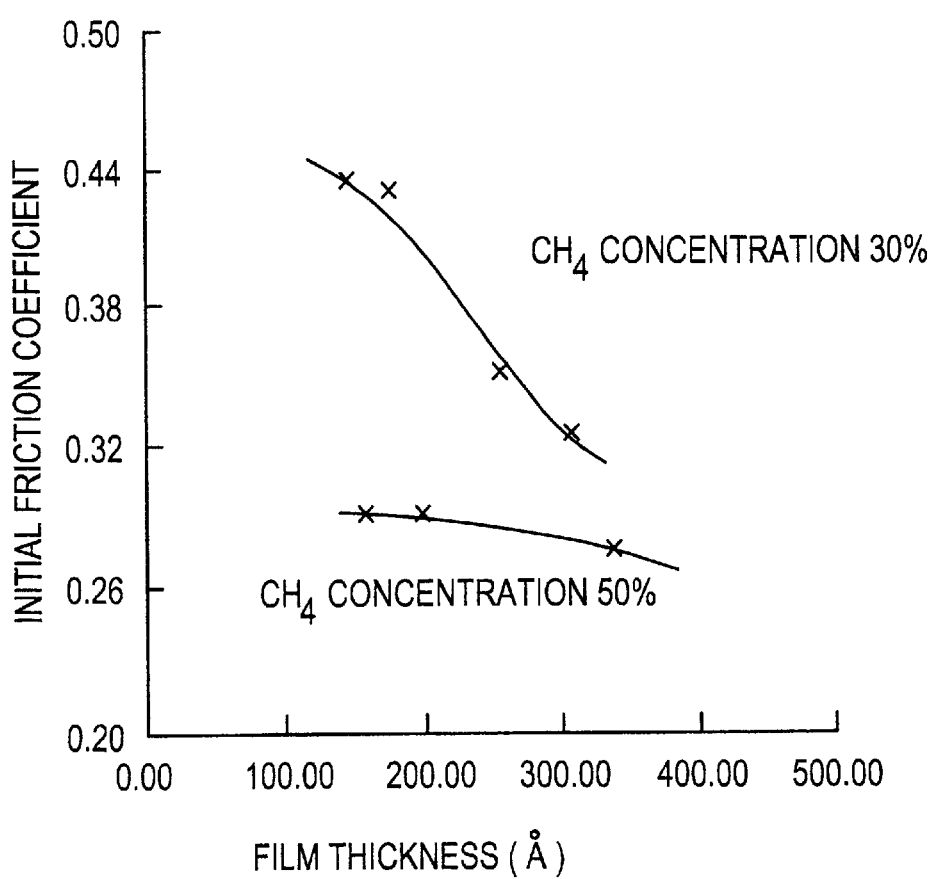
FIG. 5 shows the dependence of initial friction coefficient on the film thickness of a DLC film.

The initial friction coefficient thus obtained is plotted against the film thickness of DLC in FIG. 5. The graph reads that initial friction coefficient depends on the film thickness in case a $CH_4$ concentration was controlled to 30%. A high friction coefficient of 0.44 is obtained at a film thickness of 15 nm, and the friction coefficient lowers with increasing film thickness. A practical friction coefficient of 0.4 or lower is obtained at a film thickness of about 20 nm. No film thickness dependence is obtained at a $CH_4$ concentration of 50%, and a value of 0.3 or lower is obtained even at a film thickness of 15 nm.

Figure 6:
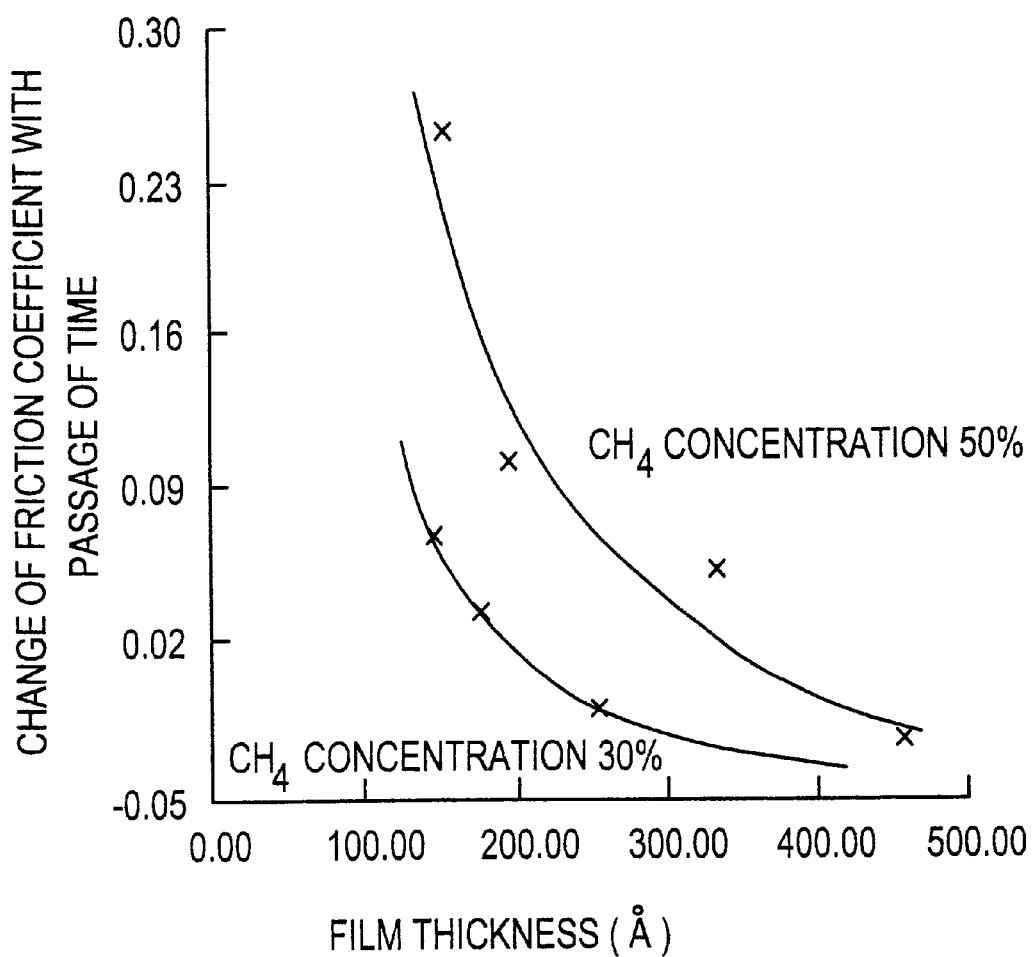
FIG. 6 shows the dependence of friction coefficient after passage of time on the film thickness of a DLC film.

The change of friction coefficient with passage of time is plotted against film thickness in FIG. 6. The change in value is the increment of friction coefficient after repeated sliding of 200 times with respect to the initial friction coefficient. It can be observed from FIG. 6 that the value depends on the film thickness irrespective of the concentration of $CH_4$, and that the change decreases with increasing film thickness. From a practical viewpoint, it is desired that no change is found in friction coefficient with passage of time. However, if the friction coefficient is limited to a value of 0.4 or lower, a change in friction coefficient with passage of time of 0.1 or lower and that of 0 or lower are desired for a $CH_4$ concentration of 50% and 30%, respectively. Thus, a film thicknesses of 27 nm or more and 21 nm or more are desired for cases with $CH_4$ concentration of 50% and 30%, respectively.

It can be seen from the foregoing discussion on the initial friction coefficient and the friction coefficient with passage of time that film thicknesses of 27 nm or more and 21 nm or more are necessary for cases with $CH_4$ concentration of 50% and 30%, respectively.

It is well-known that a signal level decreases by 1 dB for an increment of 10 nm in the distance between the magnetic head and the magnetic film. If a DLC film is deposited at a thickness sufficiently thick to assure a practically useful friction coefficient on a substrate having a surface roughness of 3 nm being used in the present example, a drop of 3 dB and that of 2.4 dB result in cases using DLC containing $CH_4$ at a concentration of 50% and 30%, respectively.

Considering a conventional process, on the other hand, a surface irregularity of 30 nm and a lubricant film 10 nm or more in thickness are necessary. Then, a drop of 4 dB or more in signal level results for the overall film structure. This signifies that the use of the DLC film according to the present invention improves the level for 1 dB or more as compared to a case according to prior art.

COMPARATIVE EXAMPLE

Figure 7:
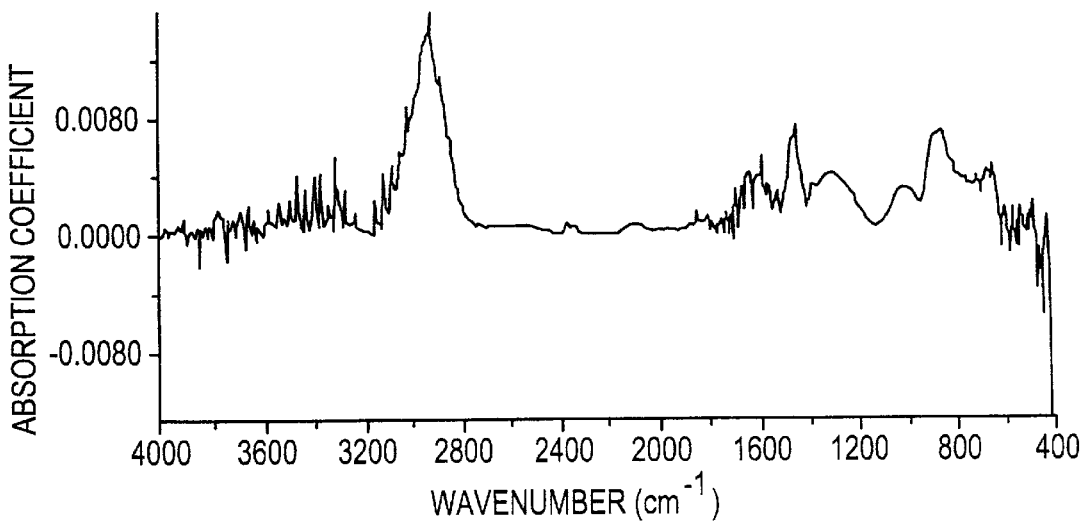
FIG. 7 shows an infrared spectrogram obtained by FT-IR (Fourier transform infrared spectroscopy) analysis for a DLC film with no silicon added therein.
Figure 8:
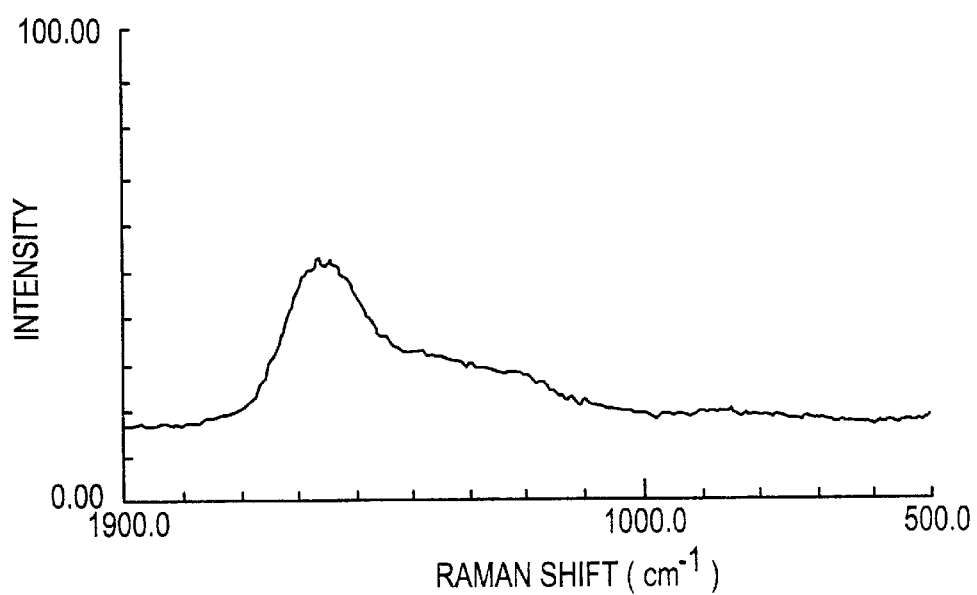
FIG. 8 shows a Raman spectrogram obtained for a DLC film with no silicon added therein.

A DLC film containing no silicon was prepared to compare with the DLC film obtained in the above example. The same magnetic film and the fabrication process as those of the above Example were used, except for adding no silane gas into the starting gas material. The results obtained by FT-IR analysis and Raman spectroscopy are given in FIGS. 7 and 8. Raman spectrogram shows that the film is a typical DLC film, and it can be observed from the FT-IR spectrogram that no Si is incorporated in the film.

Peeling occurred autogenously on the DLC formed on the magnetic film, and no film could be obtained.

It can be seen from the foregoing results that a DLC film can be deposited as a protective or lubricant film on a magnetic recording medium with improved adhesibility to the magnetic material by adding silicon. Furthermore, since the surface irregularities can be reduced by depositing the DLC film of the present invention, the magnetic properties can be improved by 1 dB or more as compared with the prior art magnetic recording media.

The present invention was explained referring specifically to a process which comprises depositing a DLC film using a CVD apparatus of a positive column type. However, the effect of the present invention is not limited by the method of film deposition. Accordingly, though not described in the above Example, the film can be deposited by using a CVD apparatus equipped with parallel planar electrodes, or by using carbon ion beam.

Furthermore, the present invention was described to a specific case using silicon as an additive, to improve the adhesibility of the DLC film. However, similar improved film adhesion strength can be achieved by using other Group IV elements such as germanium, tin and lead.

Figure 2:
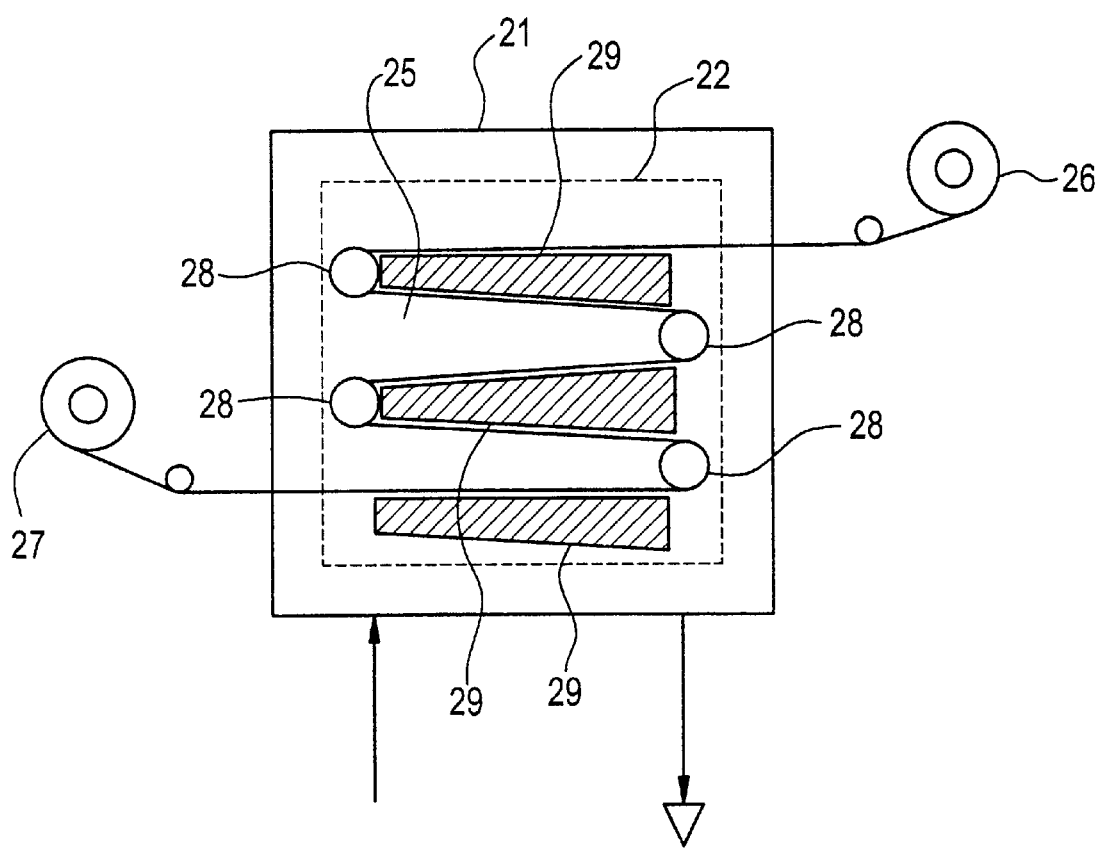
FIG. 2 shows schematically an apparatus for plasma-assisted CVD of a positive column type.
Figure 9:
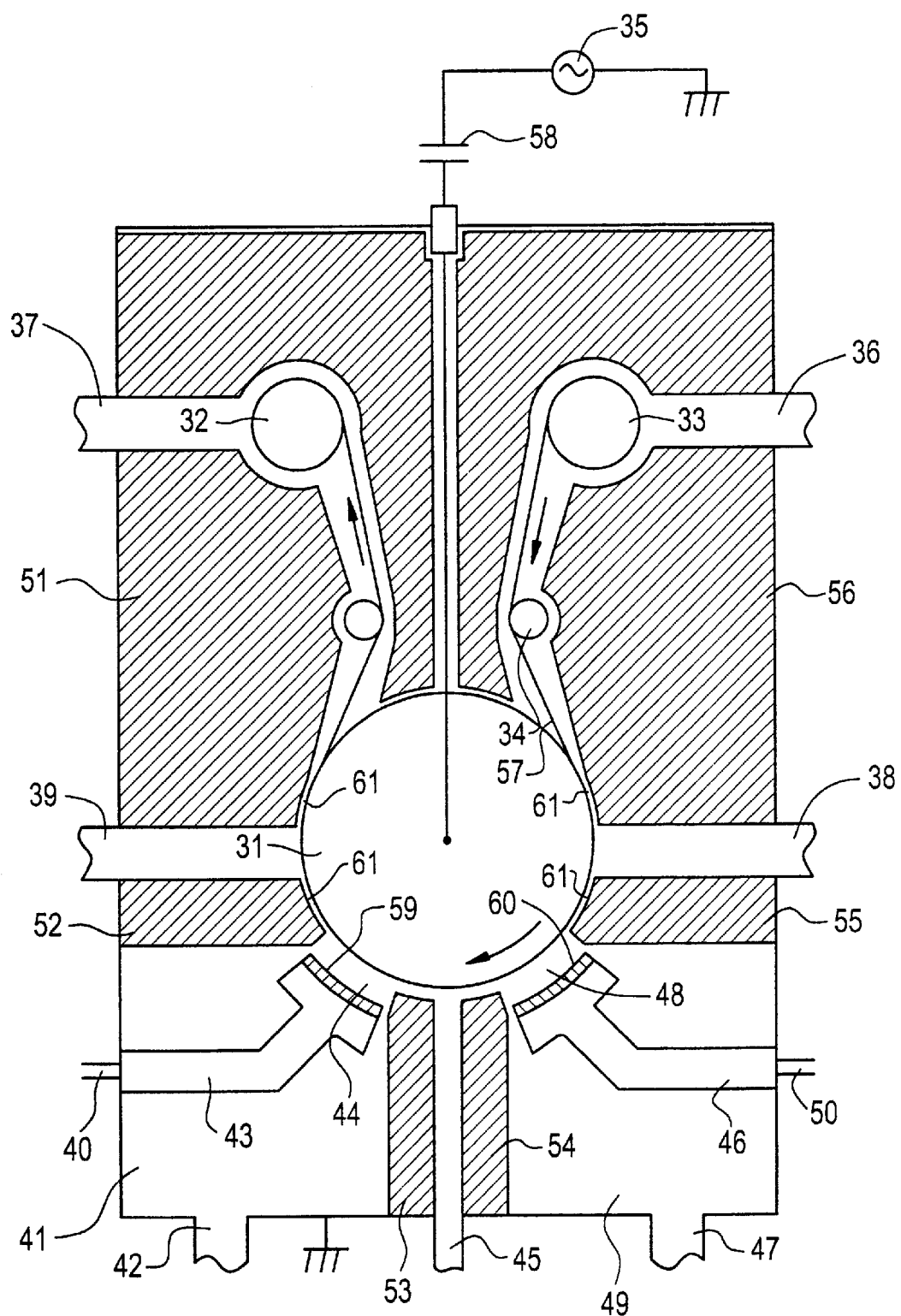
FIG. 9 is a schematic view showing a roll-to-roll type apparatus for forming a DLC film.

The DLC film of the present invention can be formed by a CVD apparatus illustrated in FIG. 9 instead of the CVD apparatus shown in FIG. 2. Referring to FIG. 9, the apparatus comprises insulators 51, 52, 53, 54, 55, and 56, a can roll 31 acting as a cathode electrode, a feed roll 33, a take-up roll 32, guide rolls 34, an RF power source 35 connected to the can roll 31 through a blocking capacitor 58, exhausting pipes 36, 37, 38, 39, 42, 45 and 47 connected to a vacuum pump, a gas supplying path 40 extending to a discharging space 44 through inside of an anode 43, a space 41 for forming a DLC film therein, a space 49 for hydrogen plasma treatment, and a gas supplying path 50 extending to a discharging space 48 through inside of an anode 46. A film substrate 57 having provided thereon a magnetic material layer is supplied from the feed roll 33, and taken up by the take-up roll 32. The space 49 and the discharging space 48 are evacuated by the vacuum pump through the exhausting pipe 47 and supplied with a $H_2$ gas from the gas supplying path 50 to maintain a pressure of the space 49 and the discharging space 48 from 60 to 100 Pa e.g. 80 Pa. The space 41 and the discharging space 44 are evacuated by the vacuum pump through the exhausting pipe 42 and supplied with an ethylene gas and a $H_2$ gas from the gas supplying path 40 to maintain a pressure of the space 41 and the discharging space 44 from 60 to 100 Pa e.g. 80 Pa. The anodes 43 and 46 are, for example, grounded. The cathode electrode, i.e. the can roll 31 is supplied with an RF electric energy from the RF power source 35 e.g. at 13.56 MHz. In this way, a discharge is caused between the can roll (cathode) 31 and the anode 46, and also a discharge id caused between the can roll (cathode) 31 and the anode 43. The film substrate 57 is then subjected to a hydrogen plasma treatment in the discharging space 48, and to a deposition of the DLC film on the magnetic material layer in the discharging space 44. The distance between the surface of the can roll 31 and the surface 59 of the anode 43, and the distance between the surface of the can roll and the surface 60 of the anode 46 are 20 mm or less, e.g. 18 mm or less. The distance 61 between the surface of the can roll 31 and each of the surfaces of the insulators 51, 52, 55 and 56 is 5 mm or less, e.g. 2 mm or less.

While the invention has been described in detail and with reference to specific embodiments thereof, it will be apparent to one skilled in the art that various changes and modifications can be made therein without departing from the spirit and scope thereof.

What is claimed is:

1. An article comprising:
  a substrate; and
  a surface protective film having a surface subject to friction formed over said substrate, said surface protective film comprising diamond-like carbon, containing hydrogen, wherein a centerline average roughness of said surface protective film is 30 nm or less and a thickness of said surface protective film is 50 nm or less.

2. An article according to claim 1 wherein a concentration of hydrogen in said surface protective film is 10 to 60 atomic %.

3. An article according to claim 1 wherein said substrate has a magnetic layer below said surface protective film.

4. An article according to claim 1 wherein said surface protective film comprises aluminum.

5. An article according to claim 1 wherein said diamond like carbon has a value of 2000 kg/mm$^2$ or higher as Vicker's hardness and has bonds which exhibit diamond-like characteristics attributed to sp$^3$ hybrid orbital.

6. An article comprising:
  a substrate; and
  a surface protective film having a surface subject to friction formed over said substrate, said surface protective film comprising diamond-like carbon containing hydrogen, wherein a friction coefficient of said surface protective film is 0.4 or less and a thickness of said surface protective film is 50 nm or less,
  wherein a center line average roughness of said surface protective film is 30 nm or less.

7. An article according to claim 6 wherein a concentration of hydrogen in said surface protective film is 10 to 60 atomic %.

8. An article according to claim 6 wherein said substrate has a magnetic layer below said surface protective film.

9. An article according to claim 6 wherein said surface protective film contains aluminum as an impurity.

10. An article according to claim 6 wherein said diamond like carbon has a value of 2000 kg/mm$^2$ or higher as Vicker's hardness and has bonds which exhibit diamond-like characteristics attributed to sp$^3$ hybrid orbital.

11. An article comprising:
  a substrate; and
  a surface protective film having a surface subject to friction formed over said substrate, said surface protective film comprising diamond-like carbon containing hydrogen at a concentration of 10 to 60 atomic %, wherein a centerline average roughness, a friction coefficient and a thickness of said surface protective film are 30 nm or less, 0.4 or less and 50 nm or less respectively.

12. An article according to claim 11 wherein said surface protective film contains nitrogen.

13. An article according to claim 11 wherein said substrate has a magnetic layer below said surface protective film.

14. An article according to claim 11 wherein said surface protective film contains aluminum as an impurity.

15. An article according to claim 11 wherein said diamond like carbon has a value of 2000 kg/mm$^2$ or higher as Vicker's hardness and has bonds which exhibit diamond-like characteristics attributed to sp$^3$ hybrid orbital.

16. An article comprising:
  a magnetic layer formed on said substrate; and
  a diamond-like carbon film formed on said magnetic layer, wherein said diamond-like carbon film comprises 10 to 60 atomic % of hydrogen and a centerline average roughness of said diamond-like carbon film is 30 nm or less,
  wherein a thickness of said diamond-like carbon is 50 nm or less.

17. An article according to claim 16 wherein a friction coefficient of a surface of said article is 0.4 or less.

18. An article according to claim 16 wherein said diamond like carbon has a value of 2000 kg/mm$^2$ or higher as Vicker's hardness and has bonds which exhibit diamond-like characteristics attributed to sp$^3$ hybrid orbital.

19. An article comprising:

a magnetic layer formed on said substrate; and a diamond like carbon film containing nitrogen formed on said magnetic layer, wherein said diamond like carbon film comprises 10 to 60 atomic % of hydrogen and a thickness of said diamond-like carbon film is 50 nm or less, wherein a centerline average roughness of said diamond-like carbon film is 30 nm or less.

20. An article according to claim 19 wherein a friction coefficient of a surface of said article is 0.4 or less.

21. An article according to claim 19 wherein said diamond like carbon has a value of 2000 kg/mm$^2$ or higher as Vicker's hardness and has bonds which exhibit diamond-like characteristics attributed to sp$^3$ hybrid orbital.

22. An article comprising:

a substrate; and a protective film formed over said substrate, said protective film comprising hydrogen and carbon including SP$^3$ hybrid orbital provided over said substrate, wherein a centerline average roughness of said protective film is 30 nm or less and a thickness of said protective film is 50 nm or less.

23. An article according to claim 22 wherein a concentration of hydrogen in said protective film is 10 to 60 atomic %.

24. An article according to claim 22 wherein said substrate includes a magnetic layer below said protective film.

25. An article according to claim 22 wherein said protective film has a value of 2000 kg/mm$^2$ or higher as Vicker's hardness.

26. An article comprising:

a substrate; and a protective film formed over said substrate, said protective film comprising hydrogen and carbon including SP$^3$ hybrid orbital provided over said substrate, wherein a friction coefficient of said protective film is 0.4 or less and a thickness of said protective film is 50 nm or less, wherein a centerline average roughness of said protective film is 30 nm or less.

27. An article according to claim 26 wherein a concentration of hydrogen in said protective film is 10 to 60 atomic %.

28. An article according to claim 26 wherein said substrate includes a magnetic layer below said protective film.

29. An article according to claim 26 wherein said protective film has a value of 2000 kg/mm$^2$ or higher as Vicker's hardness.

30. An article comprising:

a substrate; and a protective film formed over said substrate, said protective film comprising carbon including SP$^3$ hybrid orbital provided over said substrate, wherein a centerline average roughness of said protective film is 30 nm or less, a friction coefficient of said protective film is 0.4 or less and a thickness of said protective film is 50 nm or less, wherein said protective film further comprises hydrogen at a concentration of 10–60 atomic %.

31. An article according to claim 30 wherein said protective film contains nitrogen.

32. An article according to claim 30 wherein said substrate includes a magnetic layer below said protective film.

33. An article according to claim 30 wherein said protective film has a value of 2000 kg/mm$^2$ or higher as Vicker's hardness.

34. An article comprising:

a magnetic layer formed on a substrate; and a carbon film comprising carbon including SP$^3$ hybrid orbital formed on said magnetic layer, wherein said carbon film contains 10 to 60 atomic % of hydrogen and a centerline average roughness of said carbon film is 30 nm or less, and wherein a thickness of said carbon film is 50 nm or less.

35. An article according to claim 34 wherein a coefficient of said carbon film is 0.4 or less.

36. An article according to claim 34 wherein said protective film has a value of 2000 kg/mm$^2$ or higher as Vicker's hardness.

37. An article comprising:

a magnetic layer formed on a substrate; and a carbon film comprising nitrogen and carbon including SP$^3$ hybrid orbital formed on said magnetic layer, wherein said carbon film comprises 10 to 60 atomic % of hydrogen and a thickness of said carbon film is 50 nm or less, and wherein a centerline average roughness of said carbon film is 30 nm or less.

38. An article according to claim 37 wherein a coefficient of said carbon film is 0.4 or less.

39. An article according to claim 37 wherein said protective film has a value of 2000 kg/mm$^2$ or higher as Vicker's hardness.

40. An article according to claim 1 wherein said article is selected from the group consisting of an audio tape, a video tape, a floppy disk and a hard disk.

41. An article according to claim 6 wherein said article is selected from the group consisting of an audio tape, a video tape, a floppy disk and a hard disk.

42. An article according to claim 11 wherein said article is selected from the group consisting of an audio tape, a video tape, a floppy disk and a hard disk.

43. An article according to claim 16 wherein said article is selected from the group consisting of an audio tape, a video tape, a floppy disk and a hard disk.

44. An article according to claim 15 wherein said article is selected from the group consisting of an audio tape, a video tape, a floppy disk and a hard disk.

45. An article according to claim 22 wherein said article is selected from the group consisting of an audio tape, a video tape, a floppy disk and a hard disk.

46. An article according to claim 26 wherein said article is selected from the group consisting of an audio tape, a video tape, a floppy disk and a hard disk.

47. An article according to claim 30 wherein said article is selected from the group consisting of an audio tape, a video tape, a floppy disk and a hard disk.

48. An article according to claim 34 wherein said article is selected from the group consisting of an audio tape, a video tape, a floppy disk and a hard disk.

49. An article according to claim 37 wherein said article is selected from the group consisting of an audio tape, a video tape, a floppy disk and a hard disk.

* * * * *